(12) United States Patent
Götz

(10) Patent No.: US 7,467,820 B2
(45) Date of Patent: Dec. 23, 2008

(54) INDUSTRIAL TRUCK DRIVER PROTECTION ROOF

(75) Inventor: Bernhard Götz, Aschaffenburg (DE)

(73) Assignee: Linde Material Handling GmbH, Aschaffenburg (DE)

( * ) Notice: Subject to any disclaimer, the term of this patent is extended or adjusted under 35 U.S.C. 154(b) by 237 days.

(21) Appl. No.: 11/398,473

(22) Filed: Apr. 5, 2006

(65) Prior Publication Data
US 2006/0248839 A1    Nov. 9, 2006

(30) Foreign Application Priority Data
Apr. 7, 2005   (DE) .................. 10 2005 015 978

(51) Int. Cl.
*B62D 25/06* (2006.01)
(52) U.S. Cl. .................. 296/190.03; 296/102; 296/205
(58) Field of Classification Search ............ 296/190.03, 296/102, 205
See application file for complete search history.

(56) References Cited

U.S. PATENT DOCUMENTS

| | | | | |
|---|---|---|---|---|
| 3,841,430 A | * | 10/1974 | Babbitt et al. ............ | 180/89.12 |
| 4,135,756 A | * | 1/1979 | Hausmann ............. | 296/190.03 |
| 4,184,712 A | * | 1/1980 | Skahill .................. | 296/190.03 |
| 5,203,601 A | * | 4/1993 | Guillot ..................... | 296/77.1 |
| 5,688,018 A | * | 11/1997 | Simpson ..................... | 296/138 |
| 6,149,228 A | * | 11/2000 | O'Neill et al. ......... | 296/190.03 |
| 6,523,879 B2 | * | 2/2003 | Mizuta ........................ | 296/71 |
| 7,048,082 B2 | * | 5/2006 | Mori et al. ............... | 180/89.12 |
| 7,255,121 B2 | * | 8/2007 | Milner et al. ............ | 135/88.01 |

FOREIGN PATENT DOCUMENTS

| | | |
|---|---|---|
| DE | 103 32 889 A1 | 2/2005 |
| GB | 2 404 173 A | 1/2005 |

OTHER PUBLICATIONS

The wikipedia definition of the word truss found at this website☐☐http://en.wikipedia.org/wiki/Truss.*
The wikipedia definition of the word truss found at this website☐☐http://en.wikipedia.org/wiki/Truss, last updated on Mar. 12, 2008.*

* cited by examiner

*Primary Examiner*—Dennis H Pedder
*Assistant Examiner*—Melissa A Black
(74) *Attorney, Agent, or Firm*—The Webb Law Firm (57) ABSTRACT

An industrial truck driver protection roof has a frame with front-end and rear-end vertical load-bearing struts (T1-T4) that are located at a distance from each other in a transverse direction of the vehicle, and horizontal roof trusses (D1-D13) that are located in the roof area. The frame has two prefabricated assemblies (I, II) that are configured so that they can be connected to each other. Each assembly (I and II) includes two load-bearing struts (T1, T2 and T3, T4) and at least one roof truss (D1, D2, D3 and D4, D5, D6, respectively) that connects the load-bearing struts (T1, T2 and T3, T4, respectively) to each other.

18 Claims, 7 Drawing Sheets

INDUSTRIAL TRUCK DRIVER PROTECTION ROOF

CROSS-REFERENCE TO RELATED APPLICATIONS

This application claims priority to German Application No. 10 2005 015 978.8, filed Apr. 7, 2005, herein incorporated by reference in its entirety.

BACKGROUND OF THE INVENTION

1. Field of the Invention

This invention relates to an industrial truck driver protection roof with a frame that has front-end and rear-end vertical load-bearing struts that are located at a spaced distance from each other in a transverse direction of the vehicle, and horizontal roof trusses that are located in the roof area.

2. Technical Considerations

An industrial truck driver protection roof is described in DE 103 32 889 A1. In this construction, contoured load-bearing struts and roof trusses are welded with metal sheets to form a complex and expensive but stable load-bearing structure. The finished driver protection roof represents a relatively bulky and awkward assembly that takes up a large amount of shipping space and a relatively large amount of storage space.

An object of this invention is to provide an industrial truck driver protection roof of the general type described above but that is easy to manufacture, can be transported easily, requires little space for transport and storage, and entails low tooling costs.

SUMMARY OF THE INVENTION

The invention teaches that the frame has a plurality, e.g., two, pre-fabricated assemblies that are configured so that they can be connected together. Each assembly comprises two load-bearing struts and at least one roof truss that connects the load-bearing struts to each other.

A teaching of the invention is, therefore, that two prefabricated and easily transportable assemblies are formed which form the frame of the driver protection roof only after they have been connected together, either by themselves or together with additional assemblies and components. Before they are connected together, the assemblies can be stacked in a space-saving manner, which facilitates transport and takes up only a small amount of storage space compared to known roofs.

The term "vertical" as used here also includes inclined orientations of the load-bearing struts. Analogously, the term "horizontal" also includes roof trusses, the orientation of which differs from the absolutely horizontal.

It is particularly advantageous if the load-bearing struts and the roof trusses are each configured as a closed hollow profile, in particular in the form of a tubular profile. Tubular profiles are easy to manufacture and process and are also economical assembly components.

In one embodiment of the invention, two assemblies, when they are joined together, both have at least one roof truss which, at least in segments, is parallel to and next to a roof truss of the respective other assembly. Therefore, in certain areas of the driver protection roof, there is a doubling of roof trusses. This means that the load-bearing capability of the roof in that area is increased, without the need to make the profile of the individual roof truss thicker. The doubling can also be achieved by locating the roof trusses or roof truss segments in question parallel next to one another or parallel one above another.

The industrial truck driver protection roof is advantageously completed by locating a roof plate on the roof trusses. This roof plate can be manufactured separately and transported in a stack. The roof plate can be connected with the two assemblies of the frame only at the time of the final assembly. The term "roof plate" as used here is not intended to be limited to assemblies that are made entirely or partly out of metal. Of course, it is also possible to manufacture a "roof plate" from a stable plastic or composite material.

If the roof plate is provided with corrugations in the vicinity of the horizontal trusses, and the cross-sectional profile of the corrugations is at least partly adapted to the cross-sectional profile of the roof trusses, the roof plate can be used as an assembly aid for the connection of the two assemblies of the frame to each other. In this case, the corrugations in the roof plate fix the position of the roof trusses and, thus, the position of the two assemblies that make up the frame with respect to each other. The roof plate can advantageously be placed upside down for the assembly of the two assemblies that make up the frame. Therefore, no special assembly jig or apparatus is necessary.

The assembly process can be made particularly easy if corrugations that run parallel to each other, at least in segments, are located in the roof area. In each of which corrugations there is at least one roof truss. On the underside of the roof trusses that are parallel to each other, there is a profile rail that is detachably connected to the roof plate and encompasses both roof trusses.

For the detachable connection of the profile rail with the roof plate, a plurality of threaded fasteners can be advantageously provided between the parallel roof trusses.

The threaded fasteners advantageously can have a wedge-shaped nut with anti-twist protection that is engaged with the roof plate, and a screw that is engaged with the profile rail.

As an alternative to the method of detachably connecting the roof plate with the two assemblies of the frame described above, it is of course also possible to create a non-detachable connection, for example by welding.

In one advantageous configuration of the invention, the first assembly, which can be in the shape of a loop, has two front-end load-bearing struts, two longitudinally-oriented roof trusses that are connected to the struts toward the rear, and a roof truss that connects the two roof trusses transversely with each other. The second, loop-shaped assembly comprises two rear-end load-bearing struts, two longitudinally-oriented roof trusses connected to the struts toward the front, and a roof truss that connects the roof trusses transversely with each other. The assemblies can be stacked one inside another and can be connected with one another so that the longitudinally-oriented roof trusses are located next to one another in pairs.

In an additional, no less advantageous configuration of the invention, the first assembly can be in the form of a loop and comprises two front load-bearing struts, two longitudinally-oriented roof trusses that are connected to the struts toward the rear, and a roof truss that connects the roof trusses transversely with each other. The second assembly comprises two rear-end load-bearing struts and a roof truss that connects the load-bearing struts transversely with each other. The assemblies can be connected to each other so that the two transversely-oriented roof trusses are located immediately next to each other.

If the first assembly has a contoured portion in the vicinity of one of the lateral, longitudinally-oriented roof trusses, when the industrial truck driver protection roof is used for an industrial truck that has a battery-powered electrical traction drive, the traction battery can be replaced using a hoist. The roof trusses of the driver protection roof do not represent any interference to the introduction of the hoist.

In an additional advantageous configuration of the invention, the assemblies each can comprise a front-end and a rear-end load-bearing strut, connected to the roof end of each of which is a roof truss that is oriented diagonally toward the center of the roof. The two diagonal roof trusses of an assembly transition into each other. The assemblies can be connected to each other in the vicinity of the center of the roof.

For reasons of stability, it is advantageous if the diagonal roof trusses of an assembly are connected to one other with the interposition of a longitudinally-oriented roof truss. In this configuration, there are two longitudinally-oriented roof trusses parallel to each other.

In an additional development of the invention, the front-end load-bearing struts and the rear-end load-bearing struts can each be connected to one another in the lower area by a transverse panel. This improves the stability of the assemblies or of the assembled driver protection roof. The transverse panels can be simple constructions with bent or folded segments. This means that no complex or expensive shaping tooling is required for their manufacture.

BRIEF DESCRIPTION OF THE DRAWINGS

Additional advantages and unique features of the invention are explained in greater detail below on the basis of the exemplary embodiments that are illustrated in the accompanying schematic figures, in which like reference numbers identify like parts throughout.

DESCRIPTION OF THE PREFERRED EMBODIMENTS

Figure 1:
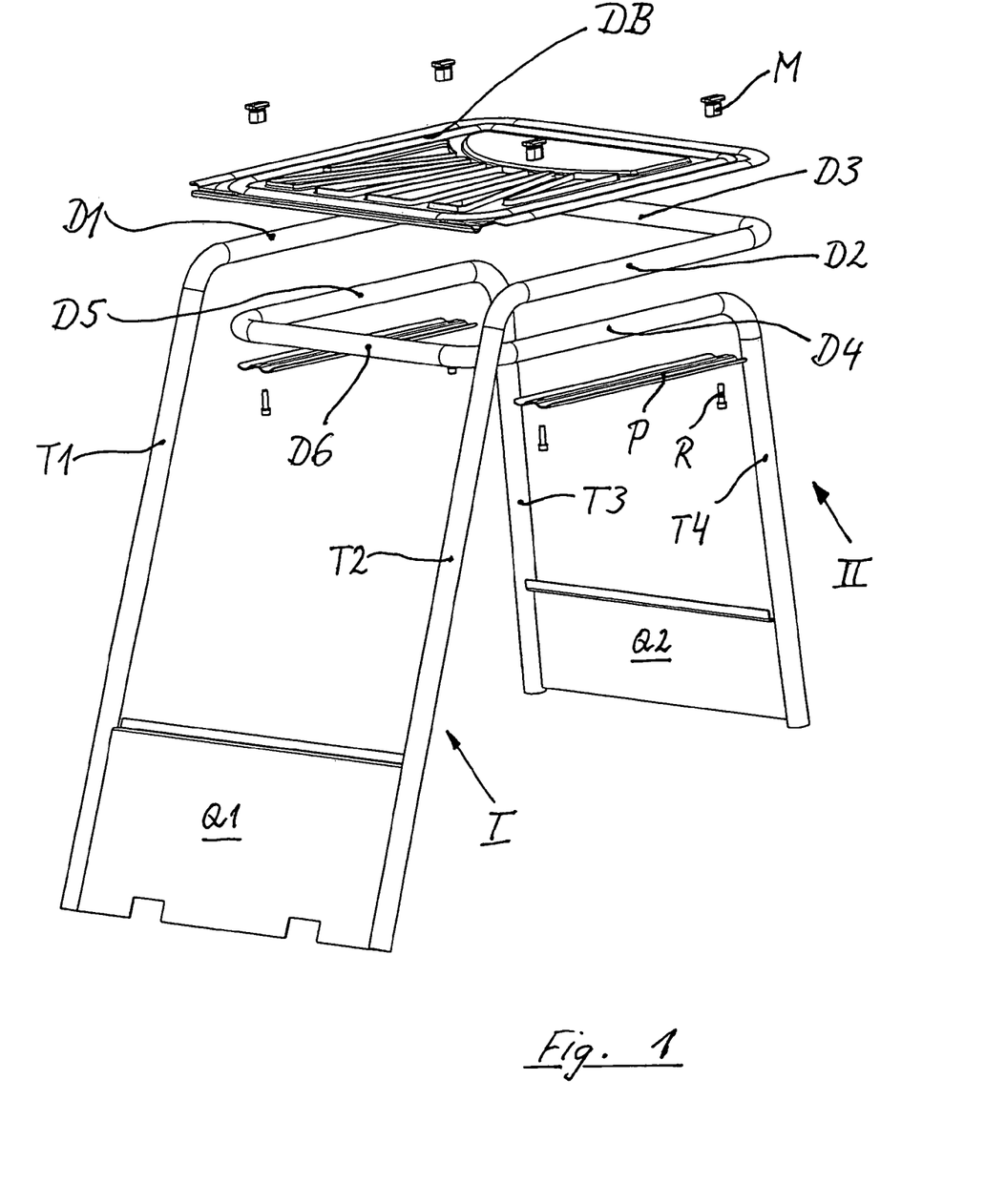
FIG. 1 is a perspective view of an industrial truck driver protection roof of the invention in an exploded view.

The industrial truck driver protection roof of the invention illustrated in FIG. 1 includes a frame with a front (first) assembly I, a rear (second) assembly II and a roof plate DB that is placed on top of them. The first assembly I, which is in the shape of a loop, comprises two, front vertical load-bearing struts T1, T2, connected to each of which toward the rear are longitudinally-oriented, horizontal roof trusses D1 and D2, respectively. The two roof trusses D1 and D2 are connected to each other on the rear end by a transversely-oriented roof truss D3.

The second assembly II, which is also in the form of a loop, comprises two rear, vertical load-bearing struts T3, T4, connected to each of which toward the front are longitudinally-oriented, horizontal roof trusses D4 and D5, respectively. The two roof trusses D4 and D5 are connected with each other on the forward end by a transversely-oriented roof truss D6.

The load-bearing struts T1-T4 and the roof trusses D1-D6 are each in the form of a tubular profile. The two front-end load-bearing struts T1 and T2 are connected to each other in the lower portion by a transverse panel Q1. Analogously, the two rear-end load-bearing struts T3 and T4 are connected to each other in the lower portion by a transverse panel Q2. The two prefabricated assemblies I and II can be stacked in a space-saving manner for purposes of transport and storage.

Figure 2:
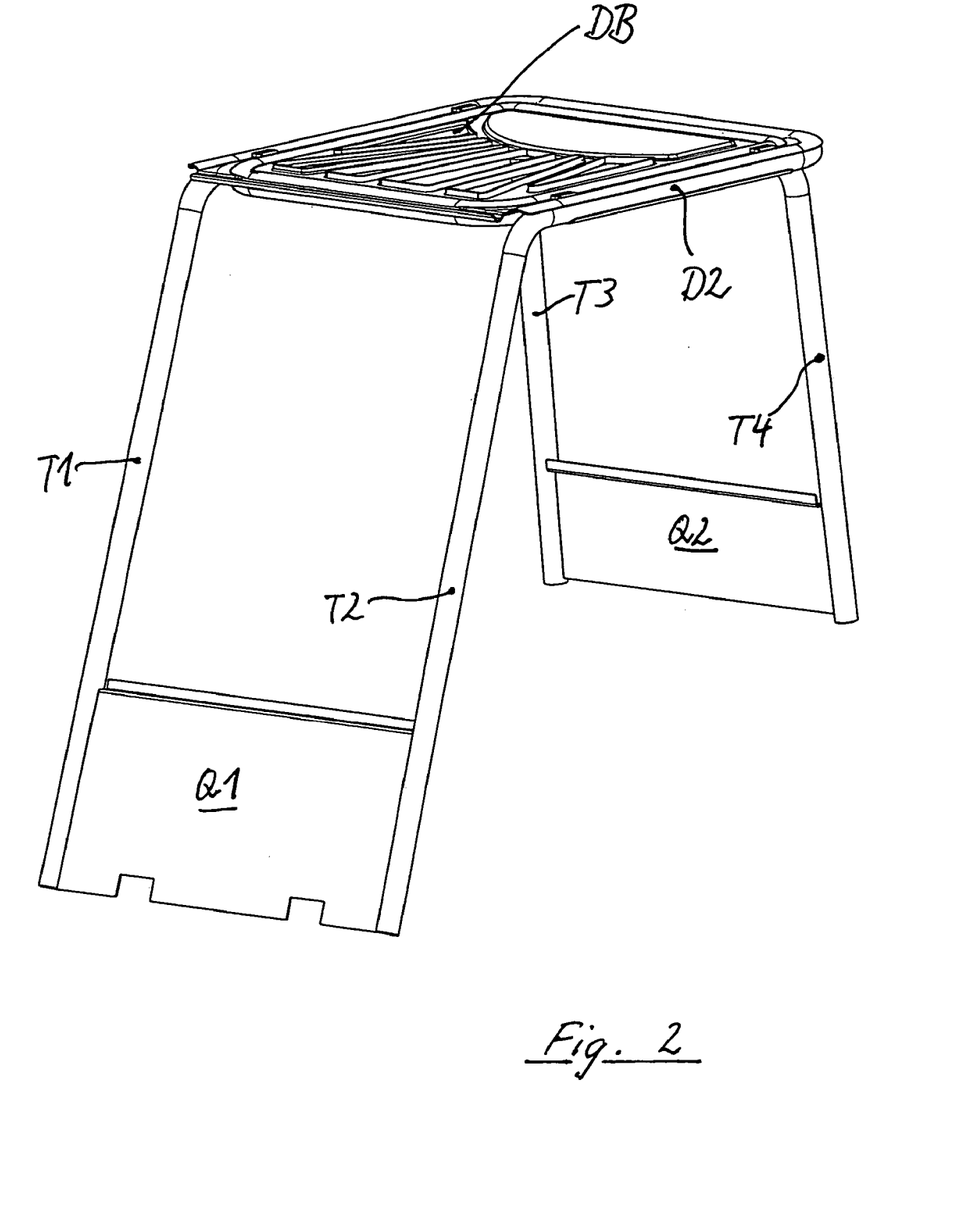
FIG. 2 is an assembled view of the industrial truck driver protection roof illustrated in FIG. 1.

FIG. 2 shows the industrial truck driver protection roof after assembly. In this exemplary embodiment, the two assemblies I and II are stacked one inside the other so that the longitudinally-oriented roof trusses are next to one another in pairs, namely so that the roof truss D1 is next to the roof truss D5 and the roof truss D2 is next to the roof truss D4 (see FIG. 1). The stability of the driver protection roof is thereby increased as a result of the doubling of the number of tubular profiles. Alternatively to the illustrated arrangement of the roof trusses parallel to each other, it is also conceivable that the roof trusses can be arranged parallel one above another.

Figure 3:
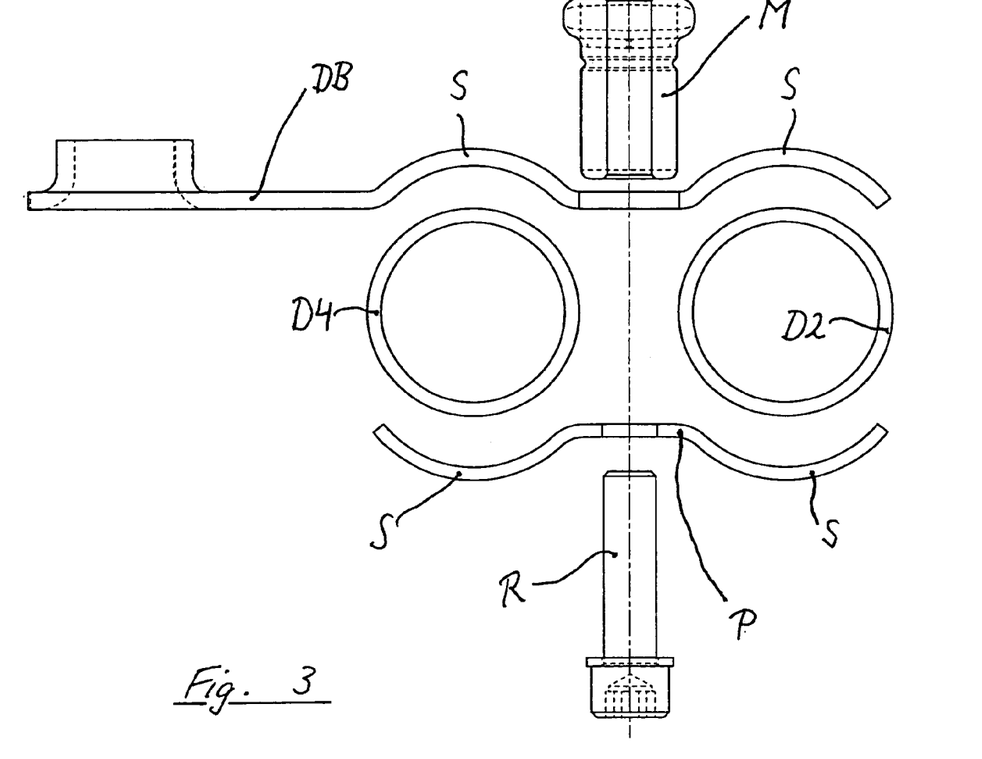
FIG. 3 is a cross section through a lateral area of the industrial truck driver protection roof in an exploded view.
Figure 4:
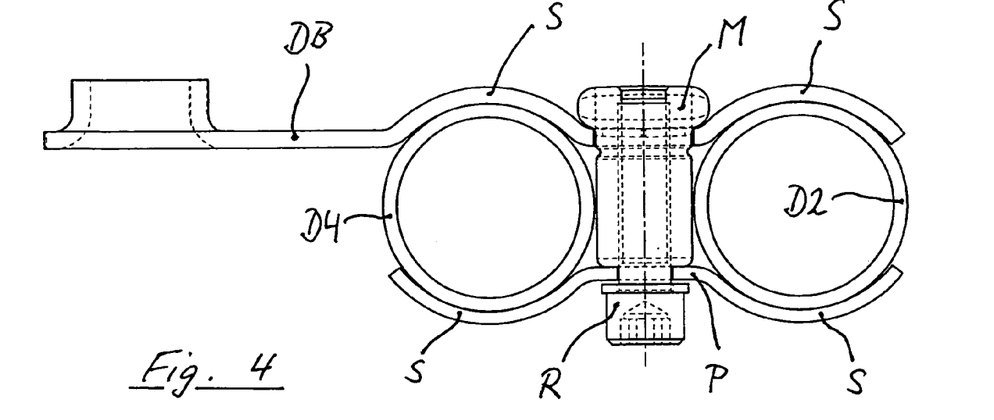
FIG. 4 is a cross section of the area illustrated in FIG. 3 showing the assembled roof.

An exemplary manner in which the two assemblies I and II can be connected with each other and with the roof plate DB is illustrated by a consideration of FIGS. 3 and 4 together, which illustrate the lateral area of the industrial truck driver protection roof with the roof trusses D4 and D2. The roof trusses D4 and D2 that are next to one another are located in corrugations S that are worked into the roof plate DB, whereby the configuration of the corrugations S is adapted to the cross section of the tubular profiles of the roof trusses D4 and D2. On the underside of the roof trusses D4 and D2 there is a profile rail P, into which corrugations S are also worked, the shape of which is adapted to the tubular cross section, so that the profile rail P at least partly encompasses the roof trusses D4 and D2.

Threaded fasteners are provided between the parallel roof trusses D4 and D2. In each of these fasteners, a wedge-shaped nut M is engaged with the roof plate DB and is prevented from twisting. A screw R is engaged with the profile rail P and is screwed into the nut M, so that the profile rail P is braced with the roof plate DB and the roof trusses D4 and D2 are clamped between them.

Of course, it is also possible to locate all of the roof trusses in corrugations of the roof plate, thereby achieving the maximum possible stability.

Figure 5:
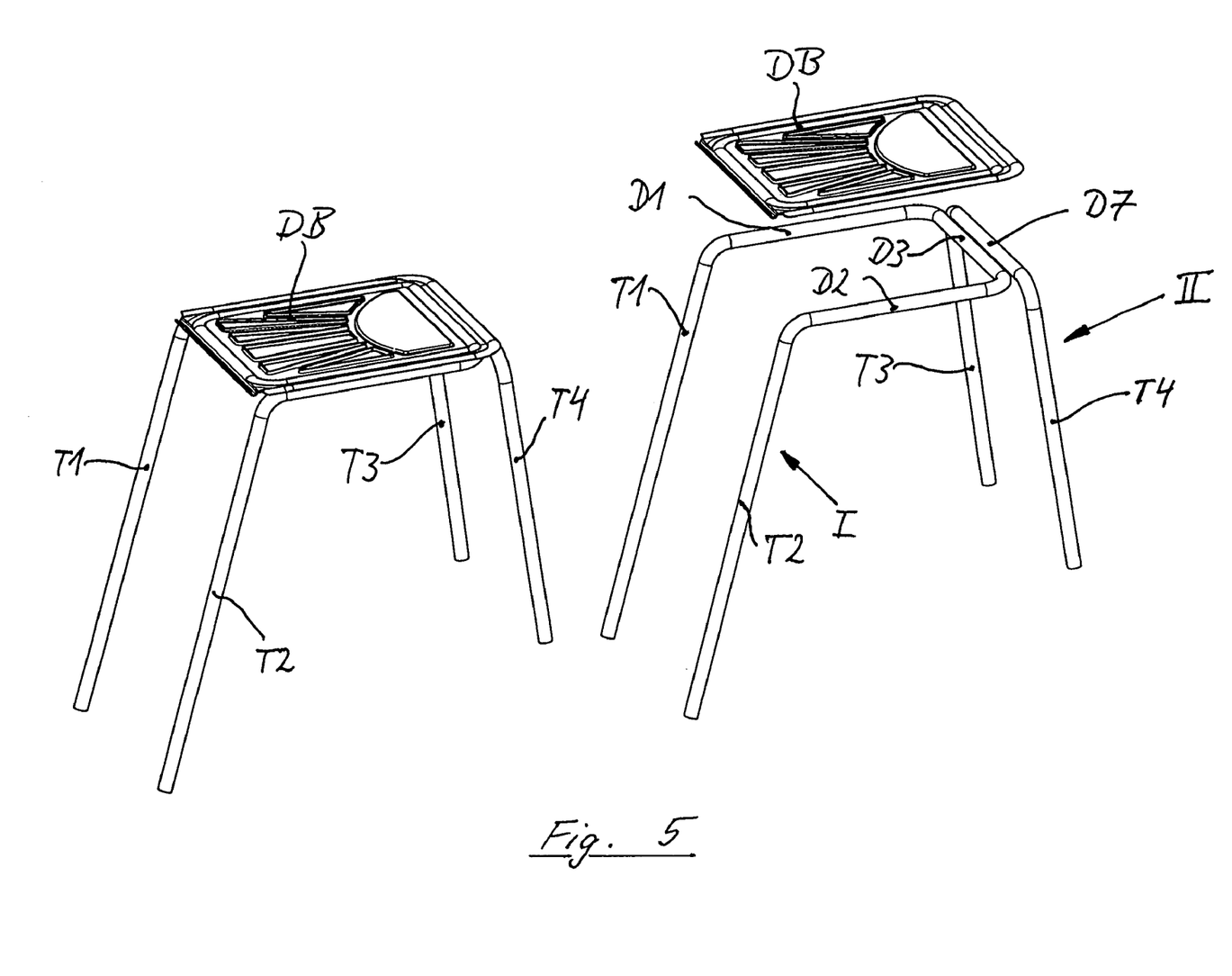
FIG. 5 presents two views in perspective of a first variant of the industrial truck driver protection roof of the invention.

FIG. 5 shows a variant of the industrial truck driver protection roof which differs from the variant illustrated in FIGS. 1 and 2 with regard to the shape of the second assembly II. In this case, the second assembly II comprises two rear-end load-bearing struts T3, T4 and a transversely-oriented roof truss D7 that connects them to each other and is oriented parallel to the roof truss D3 of the first assembly I. A construction of this type is suitable primarily for an industrial truck that is equipped with top-mounted lifting mast tilting cylinders. In this case, the tilting cylinders can be fastened to the second assembly II of the industrial truck driver protection roof, the tubular profile cross section of which can thereby have a larger diameter so that the tilting cylinder forces can be transmitted via the load-bearing struts T3 and T4 into the vehicle frame and/or into the counterweight.

Figure 6:
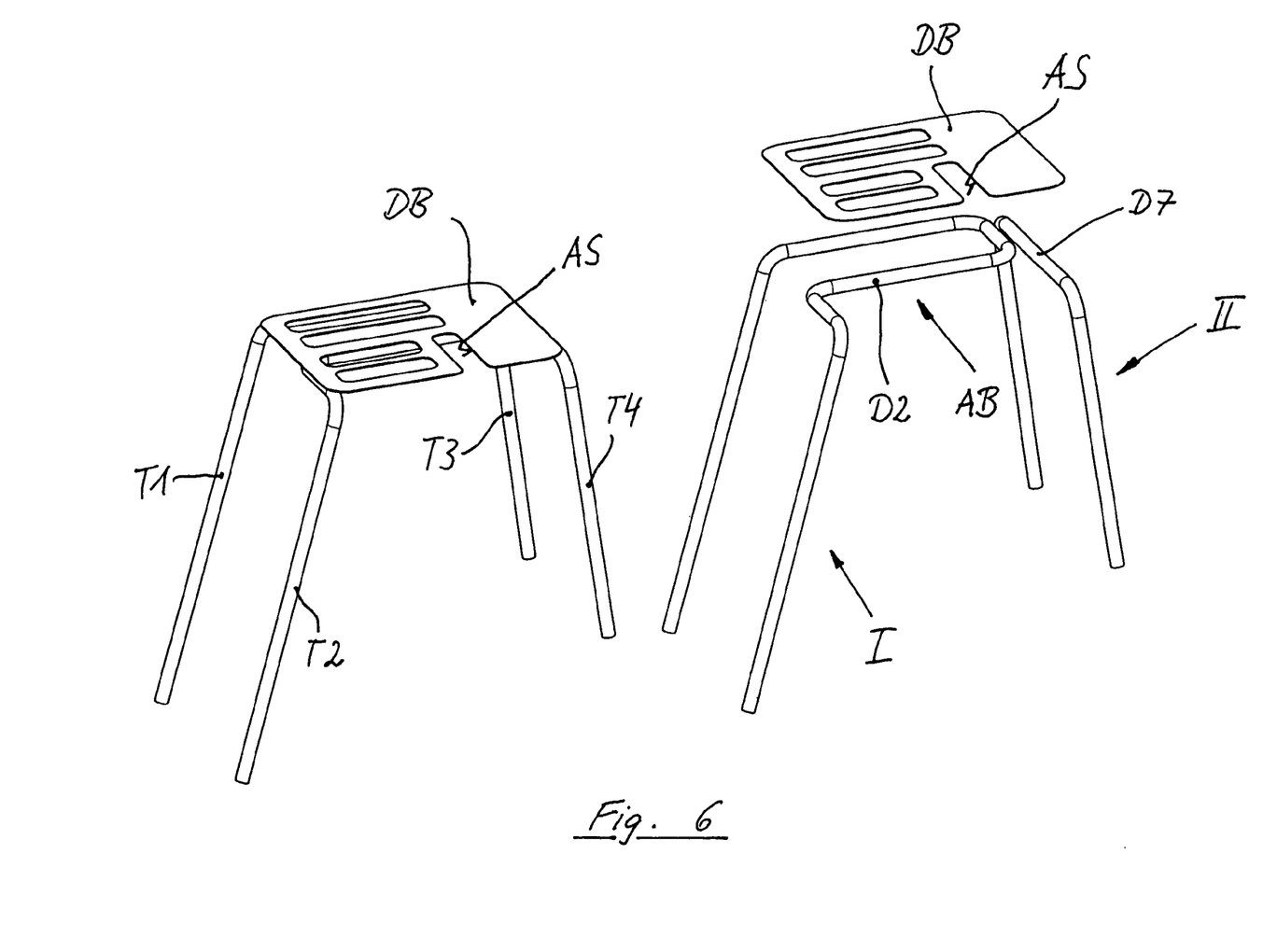
FIG. 6 presents two views in perspective of a second variant of the industrial truck driver protection roof of the invention.

The variant illustrated in FIG. 6 is basically analogous to the variant illustrated in FIG. 5, although the first assembly I has a contoured section AB in the vicinity of the lateral, longitudinally-oriented roof truss D2. When the industrial truck driver protection roof is used for an industrial truck that has a battery-powered electrical traction system, the traction battery can thereby be replaced using a hoist, which can be lowered from above through the driver protection roof. The hoist does not thereby encounter any interference from the roof trusses of the driver protection roof. The roof plate DB is advantageously provided with a cut-out portion AS, through which the hoist can be guided.

Figure 7:
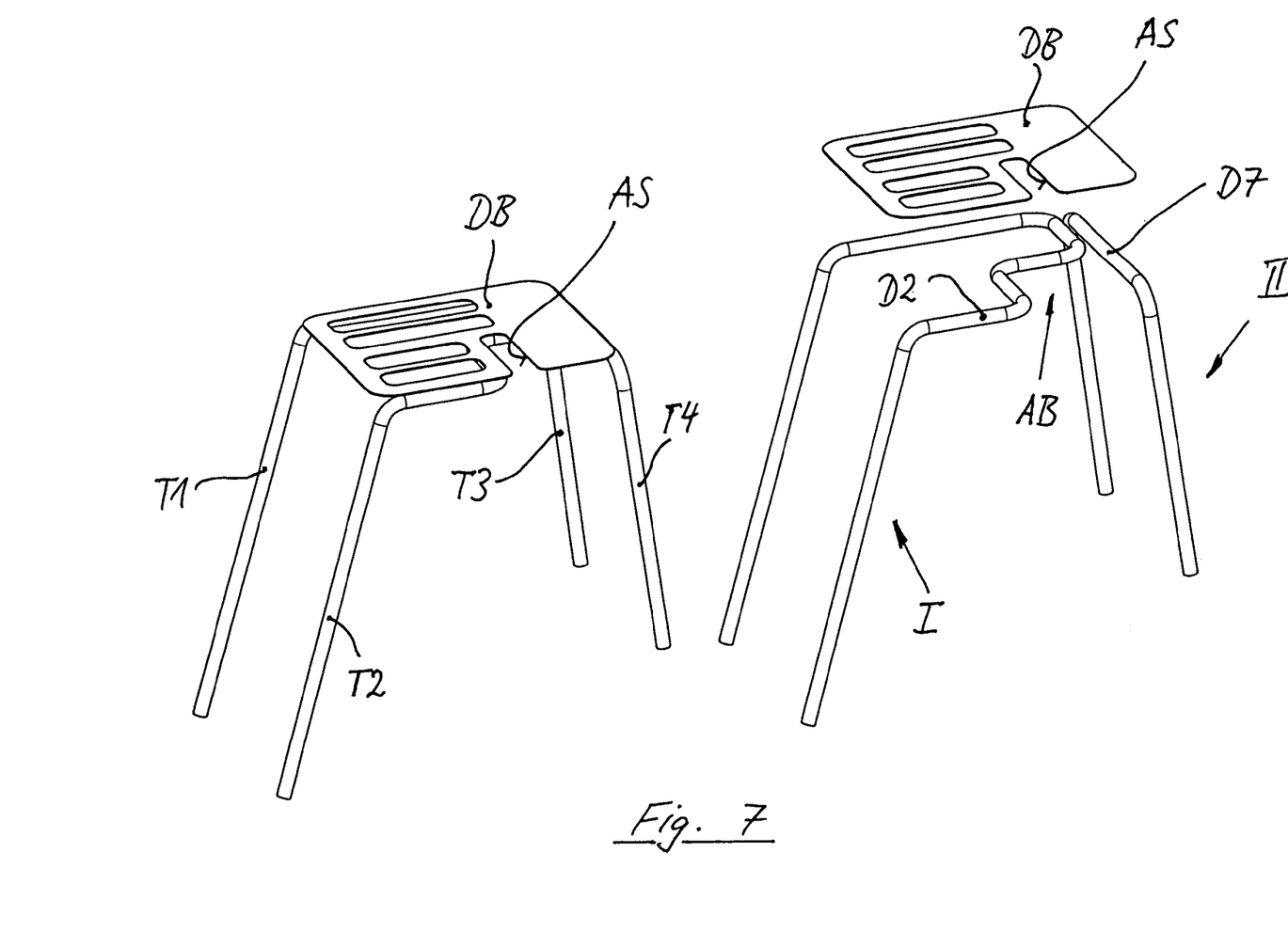
FIG. 7 presents two views in perspective of a third variant of the industrial truck driver protection roof of the invention.

The variant illustrated in FIG. 7 differs from the variant illustrated in FIG. 6 only in terms of the position and shape of the contoured portion AB of the roof truss D2.

Figure 8:
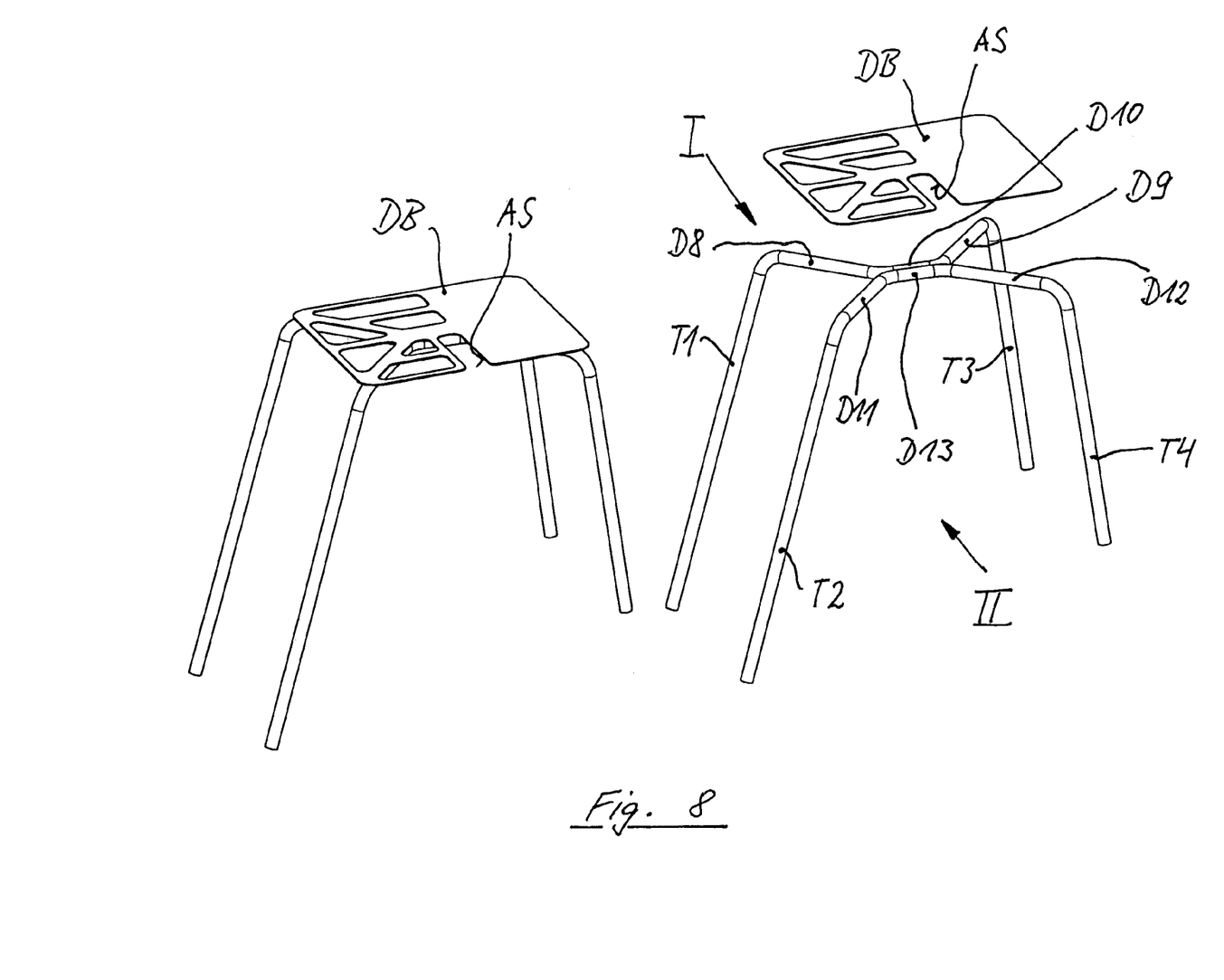
FIG. 8 presents two views in perspective of a fourth variant of the industrial truck driver protection roof of the invention.

In the variant of the industrial truck driver protection roof illustrated in FIG. 8, the two prefabricated assemblies I and II are assembled in a manner that differs from the frame constructions that have been described previously. The first assembly I comprises the front-end load-bearing strut T1 and the rear-end load-bearing strut T3. Connected to the roof ends of the load-bearing struts T1 and T3 are respective roof trusses D8 and D9, which run diagonally toward the center of the roof. The two diagonal roof trusses D8 and D9 are connected to each other with the interposition of a longitudinally-oriented roof truss D10 in the vicinity of the center of the roof.

Analogously, the second assembly II comprises the front-end load-bearing strut T2 and the rear-end load-bearing strut T4. Connected to the respective roof ends of the load-bearing struts T2 and T4 are respective roof trusses D11 and D12, which run diagonally toward the center of the roof. The two diagonal roof trusses D11 and D12 are connected to each other with the interposition of a longitudinally-oriented roof truss D13. 31 As a result of this shaping of the two assemblies I and II, there is clearance on both sides in the roof area. This can be used in the manner described above to change a traction battery using a hoist. In this variant of the industrial truck driver protection roof, the roof plate DB is also provided with a lateral cutout AS.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the fall breadth of the appended claims and any and all equivalents thereof.

What is claimed is:

1. An industrial truck driver protection roof, comprising:
a frame comprising front-end and rear-end vertical load-bearing struts that are located at a distance from each other in a transverse direction of a vehicle; and
horizontal roof members trusses located in a roof area, and
a roof plate located on the roof members,
wherein the frame comprises first and second prefabricated assemblies that are configured to be connected to each other,
wherein each assembly comprises two load-bearing struts and at least one roof member that connects the load-bearing struts to each other,
wherein the roof plate is provided in the vicinity of the roof members with corrugations, a cross-sectional profile of which is at least partly complementary to the cross-sectional profile of the roof members, and
wherein corrugations that run parallel to one another, at least in segments, are located in the roof plate, wherein in each of which corrugations there is a roof member, and wherein on an underside of the roof members that are parallel to each other, there is a profile rail that is detachably connected with the roof plate and at least partly encompasses both roof members.

2. The industrial truck driver protection roof as claimed in claim 1, wherein the load-bearing struts and the roof members are each in the form of a closed hollow profile.

3. The industrial truck driver protection roof as claimed in claim 1, wherein the two assemblies, when they are connected together, each has at least one respective roof member that is next to and parallel, at least in segments, to a roof member of the other assembly.

4. The industrial truck driver protection roof as claimed in claim 1, wherein for the detachable connection of the profile rail with the roof plate, a plurality of threaded fasteners are provided between the parallel roof members.

5. The industrial truck driver protection roof as claimed in claim 4, wherein the threaded fasteners each have a wedge-shaped and anti-twist nut that is engaged with the roof plate, and a screw that is engaged with the profile rail.

6. The industrial truck driver protection roof as claimed in claim 1, wherein the first assembly is loop shaped and comprises two front-end load-bearing struts, two longitudinally-oriented roof members that are connected to the struts toward the rear, and a roof member that connects the roof members to each other,
wherein the second assembly is loop shaped and comprises two rear-end load-bearing struts, two longitudinally-oriented roof members trusses that are connected to the struts toward the front, and a roof member that connects the roof members transversely to each other, and
wherein the assemblies are selectively stacked one inside the other and connected to each other so that the longitudinally-oriented roof members are next to one another in pairs.

7. The industrial truck driver protection roof as claimed in claim 1, wherein the front-end load-bearing stints and the rear-end load-bearing struts are each connected to one another in their lower portion by a transverse panel.

8. The industrial truck driver protection roof as claimed in claim 2, wherein the profile is a tubular profile.

9. An industrial truck driver protection roof, comprising:
a frame comprising front-end and rear-end vertical load-bearing struts that are located at a distance from each other in a transverse direction of a vehicle, and
horizontal roof members located in a roof area,
wherein the frame comprises first and second prefabricated assemblies that are configured to be connected to each other,
wherein each assembly comprises two load-bearing struts and at least one roof member that connects the load-bearing struts to each other,
wherein the first assembly is loop shaped and comprises two front-end load-bearing struts, two longitudinally-oriented roof members that are connected to the struts toward the rear, and a roof member that connects the roof members to each other,
wherein the second assembly is loop shaped and comprises two rear-end load-bearing struts, two longitudinally-oriented roof members that are connected to the struts toward the front, and a roof member that connects the roof members transversely to each other, and
wherein the assemblies are stacked one inside the other and connected to each other so that the longitudinally-oriented roof members are next to one another in pairs.

10. The industrial truck driver protection roof as claimed in claim 9, wherein the load-bearing struts and the roof members are each in the form of a closed hollow profile.

11. The industrial truck driver protection roof as claimed in claim 9, wherein the two assemblies, when they are connected together, have at least one respective roof member that is next to and parallel, at least in segments, to a roof member of the other assembly.

12. The industrial truck driver protection roof as claimed in claim 9, including a roof plate located on the roof members.

13. The industrial truck driver protection roof as claimed in claim 12, wherein the roof plate is provided in the vicinity of the roof members with corrugations, the cross-sectional profile of which is at least partly complementary to the cross-sectional profile of the roof members.

14. The industrial truck driver protection root as claimed in claim 13, wherein corrugations that run parallel to one another, at least in segments, are located in the roof plate, wherein in each of which corrugations there is a roof member, and wherein on an underside of the roof members that are parallel to each other, there is a profile rail that is detachably connected with the roof plate and at least partly encompasses both roof members.

15. The industrial truck driver protection roof as claimed in claim 14, wherein for the detachable connection of the profile rail with the roof plate, a plurality of threaded fasteners are provided between the parallel roof members.

16. The industrial truck driver protection roof as claimed in claim 15, wherein the threaded fasteners each have a wedge-shaped and anti-twist nut that is engaged with the roof plate and a screw that is engaged with the profile rail.

17. The industrial truck driver protection roof as claimed in claim 9, wherein the front-end load-bearing struts and the rear-end load-bearing struts are each connected to one another in their lower portion by a transverse panel.

18. The industrial truck driver protection roof as claimed in claim 10, wherein the profile is a tubular profile.

* * * * *

UNITED STATES PATENT AND TRADEMARK OFFICE
CERTIFICATE OF CORRECTION

PATENT NO. : 7,467,820 B2  Page 1 of 1
APPLICATION NO. : 11/398473
DATED : December 23, 2008
INVENTOR(S) : Götz It is certified that error appears in the above-identified patent and that said Letters Patent is hereby corrected as shown below:

Column 5, Line 48, Claim 1, "members trusses located" should read -- members located --

Column 6, Line 25, Claim 6, "roof members trusses" should read -- roof members --

Column 6, Line 33, Claim 7 "load-bearing stints" should read -- load-bearing struts --

Column 7, Line 11, Claim 14, "protection root" should read -- protection roof --

Signed and Sealed this

Twenty-third Day of June, 2009

JOHN DOLL
*Acting Director of the United States Patent and Trademark Office*